United States Patent Office 3,647,668
Patented Mar. 7, 1972

3,647,668
COULOMETRIC TITRATION APPARATUS
Lars Alfred Lindblad, Klinten, and Nils Rune Kahlbom, Upplands-Vasby, Sweden, assignors to Jungner Instrument Aktiebolag, Stockholm, Sweden
Filed June 3, 1968, Ser. No. 734,172
Claims priority, application Sweden, June 6, 1967, 7,902/67
Int. Cl. G01n 27/44
U.S. Cl. 204—195
4 Claims

ABSTRACT OF THE DISCLOSURE

A coulometric titration apparatus which has a Coulomb measuring device and an electrolytic titration device with a titration electrode system and a measuring electrode system is provided with an electronic apparatus which has a measuring section and a feeding section, said measuring section containing a difference amplifier connected to the measuring electrode system and having a voltage level changing device in one of the input channels thereto, and said feeding section being connected to the titration electrode system and provided with a current feedback path for obtaining rapid titration without oscillations.

---

This invention relates to a coulometric titration device having in an electrolytic titration apparatus a titration electrode system consisting of a working electrode and an auxiliary electrode, and a measuring electrode system consisting of a measuring electrode and a reference electrode, the two electrodes being connected each to one input channel of an electronic difference amplifier included in a measuring section of an electronic apparatus, a voltage level changing device being connected in one of said channels for adding (positively or negatively) to said one channel a voltage of a value corresponding to the desired voltage difference value between said measuring electrode and said reference electrode at the end point of the titration, a feeding section of said electronic apparatus having a feeding circuit provided on one hand with a control input adapted to receive a control signal governed by the difference amplifier and, on the other hand, an output circuit adapted to supply current to the titration electrode system and connected to a measuring means adapted to determine the number of Coulombs consumed at the titration.

In such devices, a voltage of such a high level must be applied across the working electrode and the auxiliary electrode that the polarization voltage thereof is exceeded by such a value that current flows in the desired direction. The relationship between the required voltage and the current obtained is not linear and this makes it difficult to obtain high titration rates. For a rapid titration, a high amplification of the control signal in the electronic feeding circuit for the titration electrode system is required, and this high amplification involves a considerable risk of oscillation in the titration system.

The present invention solves the problem of obtaining rapid titration, without the risk of oscillation, by providing the feeding circuit of the coulometric titration apparatus with a current feedback in such a way that a voltage drop across a sensing resistance connected in the output circuit of the feeding circuit counteracts the control signal to the input of the feeding circuit, said voltage drop being proportional to the current in the output circuit of the feeding circuit.

To make the most of the advantages provided by the current feedback effected in accordance with the invention, a development of the invention suggests that the feeding circuit be galvanically separated from the measuring section connected to the measuring electrode system.

The invention will now be described in detail in the following, reference being made to the accompanying drawings which illustrate a preferred embodiment and in which.

Figure 1:
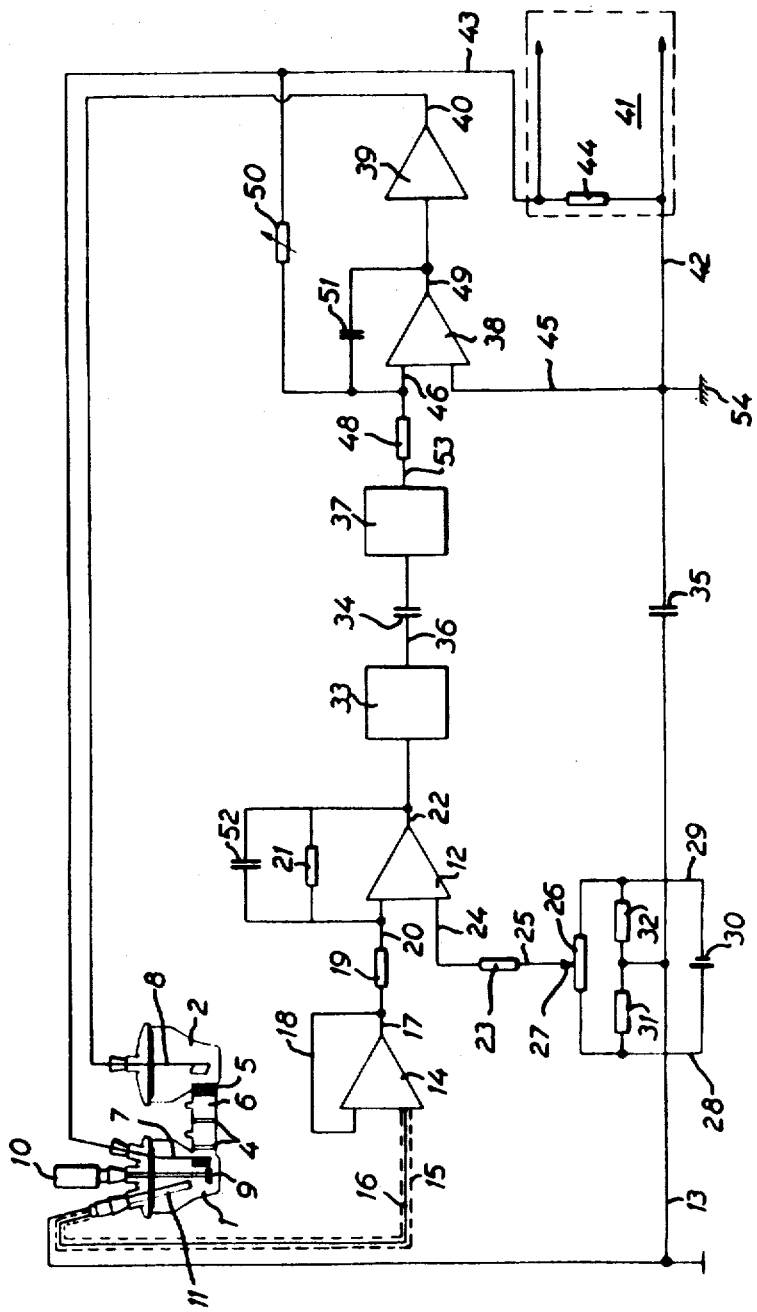
FIG. 1 is a circuit diagram of a device in accordance with the invention.

Referring to the drawings, FIG. 1 illustrates a prior art electrolytic titration apparatus having two vessels 1 and 2 interconnected at their lower ends through a pipe which contains two porous sintered glass disks 4 and a glass filter disk 5 coated with a layer 6 of silica gel. Disposed in the vessel 1 is a working electrode 7 and in the vessel 2 an auxiliary electrode 8. These electrodes may be of any desired construction and material but may preferably consist of platinum wire mesh. An agitator 9 driven by a motor 10 is also mounted in the vessel 1. Further, the vessel 1 contains a pH measuring electrode system 11 comprising in conventional manner a measuring electrode and a reference electrode, for instance a glass electrode and calomel electrode. The measuring electrode system 11 and the working electrode 7 dip into the liquid to be titrated in the vessel 1 and the auxiliary electrode 8 dips into the same or another liquid in the vessel 2. The current path required for the electrolysis is erected between the electrodes 7 and 8 by the intermediary of the liquid or liquids through the layer 6 and the disks 4, 5.

The measuring electrode system 11 is connected in the manner described in the following to a measuring section of an electronic apparatus, and the titration electrode system 7, 8 is connected in the manner described in the following to a current feeding section of the electronic apparatus. The measuring section and the current feeding section are interconnected by capacitors 34 and 35 and have separate current supply means (not shown) so that they are galvanically separated from each other outside the titration apparatus. The current feeding section has an earth connection 42 to external earth 54. The measuring section itself and its current supply means are not connected to external earth, but a wire 13 can be regarded as a reference zeo potential wire for the measuring section.

The electrodes of the electrode system 11 are connected each to one input of a difference amplifier 12. Thus, the measuring electrode of the measuring electrode system is connected to a follower amplifier 14 with the aid of a wire 16 provided with a screen 15. The screen 15 must surround the wire 16 throughout its length because the measuring electrode system 11 has a very high resistance, and the follower amplifier 14 which has an effective amplification of almost 1 has a very high input impedance so that without any screening the wire 16 would pick up from the environment electric interference which would distort the values measured by the measuring electrode system 11. Though any type of follower amplifier with an effective amplification of almost precisely 1 could be used, it has proved particularly advantageous to employ for the follower amplifier 14 a difference amplifying means one input of which is connected to the wire 16 and the other input of which is connected to the output 17 of the difference amplifying means through a wire 18. The amplifier 14 may be for instance the difference amplifier sold by G.A. Philbrick Res., Inc., U.S.A. under the designation "Model P2." By the arrangement described, the voltage in the output wire 17 will very accurately follow the voltage in the input wire 16 so that both wires 16 and 17 have the same voltage to the reference zero potential wire 13 (except the difference arising because the effective amplification of the follower amplifier 14 is insignificantly smaller than 1). The output wire 17 of the follower amplifier 14 is connected through a series resistance 19 to the input wire 20 of the difference amplifier 12. The reference electrode of the measuring electrode system 11 is connected to the reference zero potential wire 13 which forms part of the second input channel of the difference amplifier 12 and is connected in the manner described in the following to the input wire 24 of the amplifier 12. The input wire 24 is connected to one end of a resistance 23, the other end of which is connected through a wire 25 to the movable contact 27 of a potentiometer 26. Via the potentiometer 26 a D.C. source 30 is connected through wires 28 and 29. In order that the voltage of the movable contact 27 of the potentiometer 26 shall be positive or negative in relation to the reference zero potential wire 13 and thus in relation to the reference electrode of the measuring electrode system 11, the wires 28 and 29 are connected via resistances 31 and 32, respectively, to the reference zero potential wire 13.

The difference amplifier 12 which may be of the same type as the amplifier 14 or the amplifiers 55, 56 and 57 described below, amplifies the voltage difference between the voltage in the output wire 17 of the follower amplifier 14 and the voltage of the movable contact 27 of the potentiometer 26. By conventional suitable bias control in the amplifier 12, the voltage in the output wire of the amplifier is adjusted, before the apparatus is taken into use, to the reference zero potential wire 13 in such a way that this voltage is 0 v. when the voltage between the wire 17 and the contact 27 is 0 v. When the apparatus is used, the amplifier 12 will produce in its output wire 22 a signal the voltage of which in relation to the reference zero potential wire 13 is proportional to the voltage difference between the wire 17 and the contact 27. In order to obtain as good as possible a proportionality, the difference amplifier 12 is connected as an operational amplifier, in that the output wire 22 is connected to the input wire 20 through a resistance 21 so that the amplification gain of the amplifier 12 will be practically constant; in other words it will depend practically exclusively on the relationship between the resistance values of the resistances 19 and 21. Thus, when the voltage difference between the wire 17 and the movable contact 27 of the potentiometer is 0, also the output wire 22 of the amplifier 12 has the voltage 0 in relation to the reference zero potential wire 13, and this is an indication that the end point of the titration has been reached.

During titration the pH value of the solution in the vessel 1 changes, and therefore the voltage difference between the two electrodes of the measuring electrode system will also change. The point is to titrate to a certain pH value and consequently to a certain voltage difference between the two electrodes of the measuring electrode system 11. This voltage difference is set prior to the titration by adjusting the movable contact 27 of the potentiometer 26 in such a way that this contact exhibits the desired voltage difference with respect to the reference zero potential wire 13. At the end point of the titration, the set voltage difference between the output wire 17 of the follower amplifier 14 and of the movable contact 27 of the potentiometer 26 has thus been obtained, whereas the output wire 22 of the difference amplifier 12 has the voltage 0 v. in relation to the reference zero potential wire 13. In the course of the titration, the output wire 22 of the difference amplifier 12 shows voltage difference with respect to the reference zero potential wire 13, and this voltage difference is utilized in the manner described in the following for governing the supply of current to the electrodes 7 and 8 of the titration electrode system.

The output wire 22 of the difference amplifier 12 is connected to a modulator 33 which in its output wire 36 produces an alternating voltage modulated with the signal from the output wire 22 of the difference amplifier 12. By means of the capacitors 34 and 35, this alternating voltage can be transferred from the measuring section to the current feeding section. The capacitor 34 is connected between the output wire 36 of the modulator 33 and the input of a demodulator 37, whereas the capacitor 35 is connected between the reference zezro potential wire 13 of the measuring section and the earth connection 42 of the current feeding section. By means of the demodulator 37, the modulated signal arriving from the modulator 33 is converted into a control signal in the output wire 53 of the demodulator, said control signal corresponding to the signal in the output wire 22 of the difference amplifier 12 and is supplied through a resistance 48 to a control input 46 of a feeding circuit. This feeding circuit comprises on one hand a feed difference amplifying device which is composed of a difference amplifier stage 38 and a power amplifier stage 39, and the output wire 40 of which is connected to the auxiliary electrode 8, and on the other hand a measuring appliance 41 designed to determine the number of Coulombs consumed at the titration, said appliance being of any prior-art type and therefore indicated only in the form of a broken line rectangle in FIG. 1 and the inputs of the appliance being connected to, respectively, the earth connection 42 and a wire 43 leading to the working electrode 7. In the embodiment chosen, the measuring appliance 41 measures the number of Coulombs consumed at the titration by time integration of the voltage drop, caused by the titration current flow, across a resistance 44 connected between the wires 42 and 43. One input wire 45 of the difference amplifier 38 is connected to the earth connection 42. As already mentioned, the other input wire 46 of the amplifier 38 is connected to the output wire 53 of the demodulator 37 via the resistance 48. The output wire 49 of the amplifier 38 is connected to the input of the power amplifier stage 39. The amplifier 38 can be of the same type as the difference amplifier 12. The power amplifier stage 39 can be of any suitable type capable of feeding sufficiently strong current to the titration electrode system 7, 8 and capable of so changing the voltage of the output wire 40 that the current flow between the electrodes 7, 8 of the titration electrode system can be reversed to obtain a back titration when a reversible electrolyte system is being titrated.

By suitable bias control in known manner in the feed difference amplifier 38, 39 the voltage of the wire 40 is adapted to the earth connection 42 in such a way that no current flows between the titration electrodes 7, 8 when the output wire 22 of the difference amplifier 12 has the voltage 0 v. relative to the reference zero potential wire 13, and the end point of the titration has thus been reached.

The feeding circuit has current feedback in such a way that a voltage drop across the resistance 44 and proportional to the current between the titration electrodes 7, 8 counteracts the control signal to the input 46 of the feeding circuit. This has been realized by connecting a resistance 50 between the wire 43 and the input wire 46. Due to the feedback connection, the input wire 46 will have a high impedance, which means that the current between the electrodes 7, 8 can be adjusted down to 0, independently of the voltage between the electrodes 7, 8. By the arrangement described, the current through the resistance 44 will be maintained directly proportional to the voltage in the output wire 53 of the demodulator relative to earth, and this is obtained by counteracting the current through the resistance 48 by a current through the resistance 50 until the input wire 46 has attained the voltage 0 v. in relation to the earth connection 42. The magnitude of the resistance 50 directly determines the current amplification of the feeding circuit 38, 39. To adapt the arrangement to different cases of titration, the resistant 50 can be variable so that the amplification can be changed. To reduce the influence of interference and noise, a capacitor 51 is connected between the input wire 46 and the output wire 49 of the amplifier 38. For the same reason, a capacitor 52 is connected between the input 20 and the output wire 22 of the amplifier 12.

Figure 2:
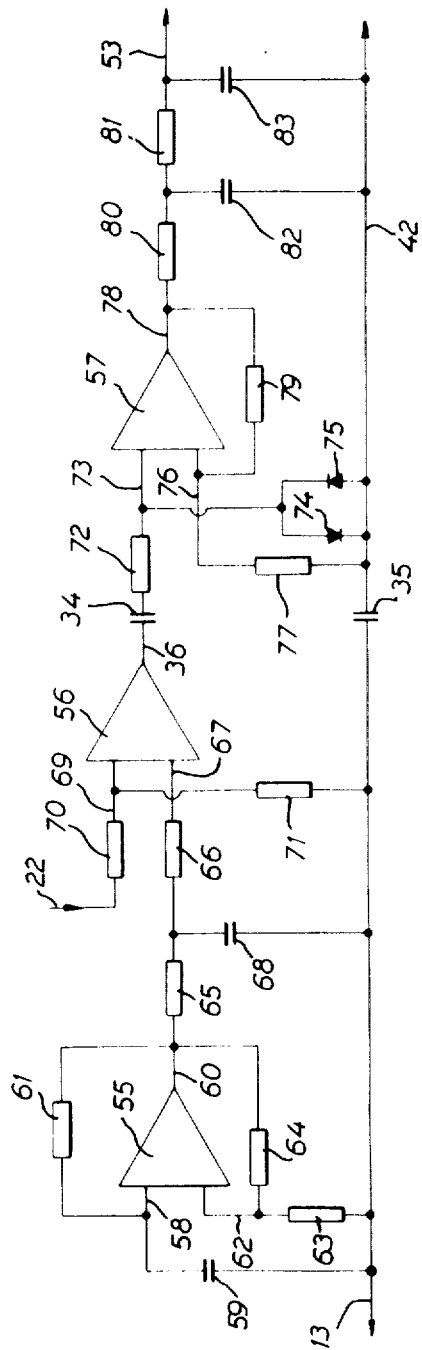
FIG. 2 shows in greater detail a circuit diagram of an embodiment of some of the circuits comprised by the device according to FIG. 1.

Although the modulator 33 and the demodulator 37 may be of any suitable type, it has proved advantageous to use an arrangement with pulse duration modulation, an example of which is shown in FIG. 2. The arrangement according to FIG. 2 employs three difference amplifiers 55, 56 and 57 which may be for instance of the type sold by SGS-Fairchild, U.S.A., under the designation $\mu$a. 709 C.

The modulator is composed of the amplifiers 55 and 56. The amplifier 55 is connected as an oscillator to produce a rectangular pulse train. Thus, one input wire 58 of the amplifier is connected on one hand to the reference zero potential wire 13 via a capacitor 59 and, on the other hand, to the output wire 60 of the amplifier via a resistance 61, whereas the other input wire 62 of the amplifier is connected on one hand to the reference zero potential wire 13 via a resistance 63 and, on the other hand, to the output wire 60 via a resistance 64. The output wire 60 is connected through two series-connected resistance 65 and 66 to one input 67 of the difference amplifier 56, and the connection wire between the resistances 65–66 is connected via a capacitor 68 to the reference zero potential wire 13. The rectangular pulse train in the input wire 60 of the oscillator 55 is integrated by means of the resistance 65 and the capacitor 68 so that a sawtooth voltage is applied to the input 67 of the amplifier 56 via the resistance 66. The other input wire 69 of the difference amplifier 56 is connected on one hand to the output wire 22 of the difference amplifier 12 (FIG. 1) via a resistance 70 and, on the other hand, to the reference zero potential wire 13 via a resistance 71. The amplifier 56 provides an output voltage which intermittently changes from one to the other of two constant voltage levels when the difference in voltage between the input wires 67 and 69 changes signs. In consequence hereof, square pulses appear in the output wire 36 of the amplifier 56, the duration of said square pulses being proportional to the voltage in the output wire 22 of the difference amplifier 12 (FIG. 1) relative to the reference zero potential wire 13.

The pulse duration modulated pulse train appearing in the output wire 36 of the amplifier 56 is fed via the capacitor 34 and a resistance 72 to one input wire 73 of the difference amplifier 57 connected in a demodulator circuit. Via two semiconductor diodes 74 and 75, connected in parallel, this wire 73 is also connected to the earth connection 42. The two diodes are connected with opposed forward directions so that they have a limiting effect on the signal supplied from the capacitor 34 via the resistance 72 to the input 73 of the amplifier 57. If the amplifier 57 is dimensioned for signals of a magnitude to be expected in the operation of the device, this limiting effect is not required, and diodes 74 and 75 can thus be dispensed with. The other input wire 76 of the difference amplifier 57 is connected on one hand to the earth connection 42 via a resistance 77 and, on the other hand, to the output wire 78 of the amplifier 57 via a resistance 79. The pulses occurring in the input wire 73 of the amplifier 57, which are amplitude limited by the diodes 74, 75 and have a duration corresponding to the voltage in the output wire 22 of the difference amplifier 12 (FIG. 1), will thus appear in amplified form in the output wire 78 of the amplifier 57. Before this signal in the output wire 78 can be used for controlling the feeding circuit 38, 39 (FIG. 1) it must be smoothed, and this is done by means of an RC network consisting of two resistances 80 and 81 connected in series with the output wire 78, and two capacitors 82 and 83 of which the capacitor 82 is connected between the earth connection 42 and the connection wire between the resistance 80 and 81, whereas the capacitor 83 is connected between the earth connection 42 and the wire 53 connecting the resistance 81 to the resistance 48 (FIG. 1) in one input of the difference amplifier 38 of the feeding circuit.

If desired, or if it is deemed necessary, one or more amplification stages may be connected between the output wire 53 of the demodulator and the resistance 48, but this is normally not required when the amplifier types here described are used. Although a pulse duration modulation has been described in detail, it is, of course, possible to use a different type of modulation, for instance amplitude modulation, for transferring a control signal from the output wire of the difference amplifier 12 to the feeding circuit of the titration electrodes 7, 8 when, as is suitable the feeding circuit is galvanically separated from the measuring section connected to the measuring electrode system.

What we claim and desire to secure by Letters Patent is:

1. A coulometric titration apparatus, comprising an electrolytic titration device, a working electrode and an auxiliary electrode forming a titration electrode system of said device, a measuring electrode and a reference electrode forming a measuring electrode system of said device, an electronic circuit, an electronic difference amplifier in said measuring electrode system, two input channels to said amplifier connected to said measuring electrode and said reference electrode respectively, voltage level changing means connected to one of said input channels for adding thereto a voltage of a value corresponding to the desired voltage difference value between said measuring electrode and said reference electrode at the end point of the titration, a feeding circuit for said titration electrode system, control input means of said feeding circuit, signal supply means connected to said control input means and to said measuring electrode system for supplying a control signal governed by said electronic difference amplifier to said control input means, separation means in said signal supply means for galvanically separating said control input means from said measuring electrode system, an output circuit of said feeding circuit connected to said titration electrode system for feeding current thereto, a measuring means connected to said output circuit of said feeding circuit for determining the number of Coulombs consumed at the titration, a sensing resistance means connected in said output circuit of said feeding circuit, and a current feedback circuit of said feeding circuit connected to said sensing resistance means to counteract the control signal fed to said control input means of said feeding circuit by means of the voltage drop across said sensing resistance means, said voltage drop being proportional to the current in said output circuit of said feeding circuit.

2. Coulometric titration apparatus according to claim 1 in which said current feedback circuit comprises a variable resistance connecting said sensing resistance means with said control input means of said feeding circuit, and an input resistance connecting said signal supply means with said control input means of said feeding circuit.

3. A coulometric titration apparatus according to claim 1 comprising output means of said difference amplifier, a modulator, control input means of said modulator, means connecting said output means of said difference amplifier to said control input means of said modulator, modulator output means of said modulator, said modulator generating in said modulator output means a changing voltage modulator by the output voltage in said output means of said difference amplifier, condensor means, a demodulator, input means and output means of said demodulator, said modulator output means being connected to said demodulator input means by means of said condensor means, said demodulator generating in said demodulator output means the control signal governed by said electronic difference amplifier, and means connecting said demodulator output means to said control input means of said feeding circuit.

4. A coulometric titration apparatus according to claim 3, in which said modulator is a pulse duration modulator.

References Cited

UNITED STATES PATENTS 3,441,490   4/1969   Johansson _____ 204—195

OTHER REFERENCES

Fitzgerald, et al., "Basic Electrical Engineering," 1957, pp. 389–392.

TA-HSUNG TUNG, Primary Examiner

U.S. Cl. X.R.

204—17